United States Patent Office 2,938,898
Patented May 31, 1960

2,938,898

PROCESS OF REACTING MONO- AND DI-SACCHARIDES WITH VARIOUS REAGENTS IN THE PRESENCE OF γ-BUTYROLACTONE

Jesse Werner, Holliswood, N.Y., and Frederick A. Hessel, Montclair, N.J., assignors to General Aniline & Film Corporation, New York, N.Y., a corporation of Delaware No Drawing. Filed Mar. 4, 1958, Ser. No. 719,004

9 Claims. (Cl. 260—209)

This invention relates to a new process of reacting monosaccharides and disaccharides with various reagents to yield a new class of compounds having utility in various chemical industries.

From the various carbohydrates available only two have attained utility in various chemical processing industries. Sorbitol, 1,2,3,4,5,6-hexanehexol, has found use in pharmaceutical compounding, as a sugar substitute for diabetics, and in the manufacture of ascorbic acid, synthetic plasticizers, humectants, and the like. Mannitol obtained artificially by the reduction of mannose or fructose is employed with boric acid in the manufacture of dry electrolytic condensers for radio application, as a resin plasticizer, and in the manufacture of mannitol hexanitrate. There are many carbohydrates which could be used successfully for various applications, but for a lack of suitable synthesis to convert them to new and useful derivatives has discouraged their exploitation on a commercial basis. For example, the inulin group of carbohydrates occurring in the tubers of the Jerusalem artichoke and in other members of the composite family of plants has been hydrolyzed to fructose, a sugar 60% sweeter than sucrose, but there has been no commercial production of the sugar itself or its derivatives. Xylose which has been produced by the hydrolysis of xylan in cottonseed hulls has discouraged exploitation of the process due to the failure to find important uses for this sugar by itself or in the form of various chemical derivatives.

Most of the monosaccharides and disaccharides are soluble in water. Some of them, while soluble in water, are also soluble or slightly soluble in alcohol. Many, however, are insoluble in alcohol and ether such as, for example, fructose, glucose, and the like. Several monosaccharides require solution in glacial acetic acid before they can be converted into sugar derivatives. The action of acetyl chloride or acetyl bromide on glucose, or the action of hydrobromic acid on pentaacetyl glucose in the preparation of glucosides, requires the solution of the glucose in glacial acetic acid. In view of this shortcoming, it is impossible to prepare halide derivatives of the various carbohydrates because of the partial esterification of the hydroxyl groups with acetic acid. If attempts are made to esterify the hydroxyl groups in carbohydrates with halogen acids using dehydrating agents such as sulfuric acid or zinc chloride, hydrolysis of the carbohydrates will take place first. This is due to the fact that all carbohydrates such as pentose or hexose when heated with mineral acids yield furfural and ω-hydroxy-methyl furfural respectively. Sucrose in the presence of acids is hydrolyzed into d-glucose and d-fructose. Dilute mineral acids break down raffinose into fructose and melibiose. More powerful acid hydrolysis yields from each molecule of raffinose, one molecule each of galactose, glucose and fructose.

The difficulty in transforming the various monosaccharides and disaccharides into new and useful derivatives is attributable to the failure to find a suitable inert solvent in which the polyhydroxy groups in the various carbohydrates would be amenable to reactivity with various chemical compounds. In the past such reactions have been extremely difficult, if not impossible, due to the insolubility of the various carbohydrates in non-reactive non-aqueous media.

It is an object of the present invention to provide an improved process of preparing carbohydrate derivatives by employing γ-butyrolactone in which the carbohydrates, i.e. monosaccharides, fructose and glucose, and the disaccharide, sucrose, are soluble and which are inert to a chemical reagent reacting with one or more hydroxy groups in the carbohydrate molecule.

Other objects and advantages will become more clearly apparent from the following description.

We have discovered that fructose, glucose and sucrose dissolved in γ-butyrolactone react readily with various reagents to give a variety of new and useful compounds which are useful in the chemical and pharmaceutical industries. By the employment of γ-butyrolactone as inert solvent-diluents, it is possible to react these specific carbohydrates with acid anhydrides to give reaction products which are soluble in ether. One or more hydroxyl groups of the carbohydrates can be replaced by chlorine by means of phosphorus, tri- and pentachloride, the corresponding iodides and bromides by treatment with phosphorus tri-iodide and phosphorus pentaiodide, and phosphorus tri-bromide and phosphorus pentabromide, respectively. The resulting halogen derivatives can be employed for the preparation of a variety of esters by reacting the halide groups with potassium cyanide to yield nitriles. With potassium hydrogen sulfide, the halogen derivatives yield thio alcohols.

The carbohydrates, i.e. fructose, glucose and sucrose, in solution in the γ-butyrolactone may be subjected to alcoholysis by heating various aliphatic and aromatic esters with the carbohydrates under conditions to induce double decomposition in the presence of small amounts of acids. The carbohydrates in such solution may be esterified with various inorganic and organic acids to yield mono- and poly-esters. Nitrous anhydride may be employed to yield esters of nitrous acid. Various esters of phosphoric acid may be prepared by the action of silver phosphate on the halide derivatives of the carbohydrates, or by the action of phosphorus oxychloride on one or more hydroxyl groups of the carbohydrates.

The most unusual feature of the present invention is that one or more hydroxyl hydrogens of the specific carbohydrates (fructose, glucose and sucrose) can be replaced by an alkali metal to yield the corresponding carbohydralates. These are readily formed from alkali metals and the hydroxyl groups of the carbohydrate with evolution of hydrogen. After evaporation, the alkali metal alcoholate is left as an amorphous powder. The alkali metals such as sodium, potassium, and lithium are very soluble in γ-butyrolactone, and polyalcoholates are readily formed if a carbohydrate in γ-butyrolactone is added to a solution of alkali metal in γ-butyrolactone. Instead of distilling the solution to remove the γ-butyrolactone, the alcoholates can be precipitated out of solution by the use of dioxane.

Since all halides and the alkali metal carbohydralates of the aforementioned specific carbohydrates are soluble in the γ-butyrolactone, this feature lends itself to the preparation of various types of ethers. For example, mono- and poly-alkali metal carbohydralates may be made to react with one or more molecular equivalents of an alkyl halide such as, methyl iodide to yield mono- and poly-methyl ethers of the corresponding carbohydrates. The various halide esters of the carbohydrates may likewise be reacted with the alkali metal carbohydralates to yield a new variety of symmetrical and unsymmetrical ethers. The halide derivatives of the various carbohydrates may be reacted with ammonia to yield amines. Amines may also be prepared by heating a solution of any carbohydrate in the pyrrolidone with zinc chloramine.

It is to be noted that the nature or character of the reagent, which is normally reactive with one or more hydrogens of hydroxy groups, is immaterial so long as the reagent is soluble or dispersible in the γ-butyrolactone. During the course of our experimentation with the γ-butyrolactone as inert-solvent diluents, we have noted that all of the currently available reagents may be employed such as halogen hydracids, e.g. hydrochloric acid, hydrobromic acid, hydroiodic acid and the like including acids such as nitrous acid, nitric acid, hypochloric acid, sulfuric acid, phosphoric acid, boric acid, silicic acid, unsaturated and saturated mono- and poly-carboxylic acids and their anhydrides such as, for example, acetic acid, propionic acid, butyric acid, caproic acid, capric acid, acrylic acid, vinyl acetic acid, methyl acrylic acid, teracrylic acid, erucic acid, sorbic acid, maleic acid, fumaric acid, adipic acid, sebacic acid, citraconic acid, tricarballylic acid, aconitic acid, ethylene tetracarboxylic acid and the like. Acetylating agents such as formyl chloride, acetyl chloride, propionyl chloride, butyl chloride, stearoyl chloride, benzoyl chloride and the like, can also be employed as the reagents to react with one or more hydroxyl groups of the specific carbohydrates and their equivalents.

As examples of the specific carbohydrates which are soluble in the γ-butyrolactones, and the resulting solutions subject to any one of the foregoing reactions, the following are illustrative:

α-D-glucose
D-glucose
β-D-glucose
D-glucose hydrate
l-glucose hydrate
Dl-glucose
D-fructose
Dl-fructose
Sucrose The following examples will serve to show how the process of our invention may be carried out to yield a new class of carbohydrate derivatives. It is to be understood that these examples are merely illustrative and are not to be construed as being limitative.

Example I 5.0 grams of sucrose were added to 10.0 grams of γ-butyrolactone and the mixture heated until solution was complete. To this solution were added 31.0 grams of palmitoyl chloride and the mixture heated until the palmitoyl chloride dissolved. After about one minute of continued heating, an amber color began to form, accompanied by an exothermic reaction and a copious evolution of hydrogen chloride. Heating, which was discontinued after the exotherm, was then reapplied after evolution of heat and gases had stopped, to insure completeness of reaction. The batch was drowned in one liter of water, to yield a heavy brown precipitate, which was filtered and washed with warm water, and then air dried for forty-eight hours. The resulting dark brown waxy solid (octapalmitoyl sucrose) had a low melting point (less than 50 C.). It may be employed as a relatively inexpensive plasticizer or in water-repellent compositions.

Example II

Example I was repeated except that 5.0 grams of d-fructose were used instead of 5.0 grams of sucrose. The resultant solid in this case had essentially the same physical properties as in Example I.

Example III

Example I was repeated except that 15.5 grams of polmitoyl chloride were used instead of 31.0 grams. The resultant solid (tetra-palmitoyl sucrose) in this case had essentially the same physical properties as in Example I except that it had a slightly higher melting point.

Example IV 1.0 gram of sucrose was added to 5.0 grams of γ-butyrolactone and the mixture heated until solution was complete. The resulting solution is water-soluble, but yields a white precipitate of sucrose from carbon tetrachloride. To this solution were then added 5.0 cc. of acetic anhydride and 0.1 gram of sodium methylate, and the mixture heated to the boil for several minutes. The resulting solution, now straw colored and insoluble in water was soluble in carbon tetrachloride. The resulting product is probably the tetra-acetate of sucrose.

Example V

One-tenth molecular equivalent of d-glucose (18.0162 grams) and six-tenths molecular equivalent of maleic anhydride (49.0300 grams) were added to 200 cc. of γ-butyrolactone and heated under reflux for two hours. The reaction mixture was then drowned in two liters of water, and filtered, then washed with warm water, whereby a dark brown solution was obtained and no precipitate. This solution was found to have good foaming properties.

Example VI 1.0 gram of sucrose was added to 5.0 grams of γ-butyrolactone and the mixture warmed until a solution was obtained. The resulting solution was clear and water soluble at the boil and white and water soluble at room temperature. 3.0 cc. of sulfuryl chloride were added and an exothermic reaction occurred giving a black solution, which on drowning in water gave no precipitate. The resulting compound was identified as a partially chlorinated sucrose.

Example VII 1.0 gram of sucrose was dissolved in 10.0 grams of γ-butyrolactone, and 1.0 gram of 1,4-dichloro-2-butyne was added and the mixture heated for one-half hour. On drowning in water, no precipitate was obtained and a yellow solution results which has good foaming properties. The resulting compound is believed to be a cross-linked carbohydrate containing several

groups.

Example VIII

Example VII was repeated except that 1.0 gram of d-glucose was substituted for 1.0 gram of sucrose. The resultant yellow solution also had good foaming properties.

Example IX

To a 100 cc. flask, equipped with a thermometer, stirrer and condenser, 12.5 grams of sucrose, 3.31 grams of peanut oil, 0.046 gram of sodium methylate and 55.2 grams of γ-butyrolactone were added and the mixture heated with stirring for 5 hours at 150°–170° C. At the end of this time, a portion of the reaction mixture was drowned in water. No precipitate forms and the yellow solution has foaming properties. By partial evaporation and addition of sodium chloride, a precipitate forms. This product is water soluble and shows foaming properties. It can be employed as a foaming or sudsing agent.

Example X

Example IX was repeated except that 12.5 grams of d-fructose were added instead of 12.5 grams of sucrose. The resultant properties were similar.

From the foregoing specification and working examples, it becomes clearly manifest that numerous reactions involving one or more hydroxyl groups of the carbohydrates disclosed herein yield new derivatives having diversified uses in the chemical industry.

We claim:

1. The process of reacting at least one hydroxy group of a carbohydrate selected from the group consisting of fructose, glucose and sucrose with a reagent reactive with said group which comprises conducting the reaction in the presence of γ-butyrolacetone in which the said carbohydrate and said reagent are soluble therein.

2. The process of reacting at least one hydroxy group of sucrose with a reagent reactive with said group which comprises conducting the reaction in the presence of γ-butyrolactone in which the said sucrose and said reagent are soluble therein.

3. The process of reacting at least one hydroxy group of fructose with a reagent reactive with said group which comprises conducting the reaction in the presence of γ-butyrolactone in which the said fructose and the said reagent are soluble therein.

4. The process of reacting at least one hydroxy group of glucose with a reagent reactive with said group which comprises conducting the reaction in the presence of γ-butyrolactone in which the said glucose and the said reagent are soluble therein.

5. The process of reacting at least one hydroxy group of sucrose with palmitoyl chloride which comprises conducting the reaction in the presence of γ-butyrolactone in which the said sucrose and the said palmitoyl chloride are soluble therein.

6. The process of reacting at least one hydroxy group of sucrose with acetic anhydride which comprises conducting the reaction in the presence of γ-butyrolactone in which the said sucrose and the said acetic anhydride are soluble therein.

7. The process of reacting at least one hydroxy group of glucose with maleic anhydride which comprises conducting the reaction in the presence of γ-butyrolactone in which the said glucose and the said maleic anhydride are soluble therein.

8. The process of reacting at least one hydroxy group of sucrose with sulfuryl chloride which comprises conducting the reaction in the presence of γ-butyrolactone in which the said sucrose and the said sulfuryl chloride are soluble therein.

9. The process of reacting at least one hydroxy group of sucrose with 1,4-dichloro-2-butyne which comprises conducting the reaction in the presence of γ-butyrolactone in which the said sucrose and the said 1,4-dichloro-2-butyne are soluble therein.

References Cited in the file of this patent

UNITED STATES PATENTS

| | | |
|---|---|---|
| 2,602,789 | Schwartz | July 8, 1952 |
| 2,632,006 | Blume | Mar. 17, 1953 |
| 2,853,485 | Werner et al. | Sept. 23, 1958 |